(12) United States Patent
Dilligan et al.

(10) Patent No.: US 10,845,282 B2
(45) Date of Patent: Nov. 24, 2020

(54) TEST COUPONS HAVING NODE BONDS, METHODS FOR TESTING NODE BONDS, AND RELATED APPARATUSES

(71) Applicant: The Boeing Company, Chicago, IL (US)

(72) Inventors: Matthew Anthony Dilligan, Seattle, WA (US); William B. H. Grace, Vashon, WA (US); Brice Thompson Collamer, Mukilteo, WA (US); Joe M. Walters, Everett, WA (US); Randy Jay Grove, Tukwila, WA (US)

(73) Assignee: THE BOEING COMPANY, Chicago, IL (US)

( * ) Notice: Subject to any disclaimer, the term of this patent is extended or adjusted under 35 U.S.C. 154(b) by 718 days.

(21) Appl. No.: 15/439,630

(22) Filed: Feb. 22, 2017

(65) Prior Publication Data

US 2018/0238786 A1    Aug. 23, 2018

(51) Int. Cl.
*G01N 3/56* (2006.01)
*B32B 7/14* (2006.01)
(Continued)

(52) U.S. Cl.
CPC ............... *G01N 3/56* (2013.01); *B32B 3/12* (2013.01); *B32B 7/14* (2013.01); *G01M 5/0016* (2013.01);
(Continued)

(58) Field of Classification Search
CPC .... G01N 3/56; G01N 2203/0282; B32B 3/12; B32B 7/14; B32B 3/30; B32B 7/12;
(Continued)

(56) References Cited

U.S. PATENT DOCUMENTS

| 7,589,457 B2 * | 9/2009 | Lee ..................... G01N 27/24 310/338 |
| 8,142,597 B2 * | 3/2012 | Miyamoto ............. H05K 1/167 156/250 |

(Continued)

OTHER PUBLICATIONS

Ashad et al, Finite Element Analysis of Aluminum Honeycombs Subjected to Dynamic Indentation and compression Loads, 2016.*

(Continued)

*Primary Examiner* — Gregory J Toatley, Jr.
*Assistant Examiner* — Lynda Dinh
(74) *Attorney, Agent, or Firm* — Womble Bond Dickinson (US) LLP

(57) ABSTRACT

A test coupon having node bonds is disclosed. In some aspects, the method includes a first foil and a second foil, stripes of adhesive serially disposed across a width of the first foil or the second foil and coupling the first foil and second foil to one another to form node bonds, and a first adherend coupled to the first foil and a second adherend coupled to the second foil such that the first foil and the second foil are provided between the first adherend and the second adherend, the first adherend and the second adherend being connectable to load blocks of a test apparatus capable of loading the test coupon to determine characteristics of each of the node bonds formed from the stripes of adhesive. A method for testing node bonds and a related apparatus are also disclosed.

20 Claims, 9 Drawing Sheets

(51) Int. Cl.
  *B32B 3/12* (2006.01)
  *G01M 5/00* (2006.01)
  *B29C 65/00* (2006.01)

(52) U.S. Cl.
  CPC ..... *B29C 66/7254* (2013.01); *B32B 2305/024* (2013.01); *Y10T 156/10* (2015.01); *Y10T 428/24149* (2015.01)

(58) Field of Classification Search
  CPC ............ B32B 2605/18; B32B 2250/40; B32B 2305/024; B32B 2607/00; G01M 5/0016; G01M 5/0033; G01M 5/0041; B29C 66/7254; Y10T 56/10; Y10T 428/24149
  See application file for complete search history.

(56) References Cited

U.S. PATENT DOCUMENTS

| | | | |
|---|---|---|---|
| 2011/0042124 A1* | 2/2011 | Matsui | H05K 1/0274 174/157 |
| 2011/0250445 A1* | 10/2011 | Alderson | C09J 7/29 428/343 |
| 2017/0194721 A1* | 7/2017 | Fan | H01R 4/04 |

OTHER PUBLICATIONS

Ji et al, Thermo-Plastic Finite Element Analysis for Metal Honeycomb Structure, 2013.*

Bishopp, Adhesives for Aerospace Structures, 2011.*

Datla, N. V., et al., "Modified DCB And CLS Specimens for Mixed-Mode Fatigue Testing of Adhesively Bonded Thin Sheets," *International Journal of Adhesion & Adhesives*, 2010, pp. 439-447, vol. 30.

Hodge, A., and Dambaugh, G., "Analysis of Thermally Induced Stresses on the Core Node Bonds of a Co-Cured Sandwich Panel," *Journal of Composite Materials*, 2012, pp. 467-474, vol. 47(4).

Jethwa, J. K., et al., "A New Test Method for Determining the Adhesive Fracture Energy When Bonding Thin or Coated Substrates," *Journal of Materials Science Letters*, 1995, pp. 155-157, vol. 14.

* cited by examiner

TEST COUPONS HAVING NODE BONDS, METHODS FOR TESTING NODE BONDS, AND RELATED APPARATUSES

TECHNOLOGICAL FIELD

The present disclosure relates generally to node bonds of honeycomb structures, and, in particular, to test coupons having node bonds, methods for testing node bonds, and related apparatuses.

BACKGROUND

Honeycomb structures comprise outer panels bonded to a honeycomb core. The honeycomb core comprises a plurality of hollow cells formed between thin vertical walls and are typically manufactured by printing stripes of adhesive on thin foils in an alternating pattern as additional foils are added. The stripes of adhesive are then cured. The stripes of adhesive form a bonded connection between each of the thin foils, which is known as a "node bond." The outer layers of the thin foils may be pulled apart, so that the inner layers of the thin foils expand to form the hollow cells between adjacent node bonds.

In some applications, honeycomb structures are utilized in the aerospace industry due to high out-of-plane compression properties and out-of-plane shear properties, while being of minimal density. As such, honeycomb structures are capable of withstanding extreme working conditions (e.g., thermal loads, mechanical loads, etc.), while not adding significant payload weight. However, use of dissimilar materials in the outer panels and in the honeycomb core may result in residual stresses remaining within the honeycomb structure after bonding that, when compounded with extreme working conditions, result in significant degradation and fatigue failure over a service life of the honeycomb structure.

As such, it is difficult to predict a durability of node bonds of a honeycomb structure under these extreme conditions in a laboratory setting. This is because simulating such extreme conditions in the laboratory setting; namely, induced thermo-mechanical loading of the node bonds over an estimated service life of the honeycomb structure is time intensive and expensive. For example, an estimated service life for a typical aircraft is approximately 120,000 flights, such that a typical honeycomb structure utilized in an aircraft has the same service life. Yet, subjecting a honeycomb structure in a laboratory setting to approximately 120,000 thermal cycles may take months, if not years to complete.

Therefore, a need exists for test coupons having node bonds, methods for testing node bonds, and related apparatuses, which enable testing of node bonds of honeycomb structures taking into account at least some of the issues discussed above, as well as possibly other issues.

BRIEF SUMMARY

Example implementations of the present disclosure are generally directed to test coupons, methods for testing test coupons, and related apparatuses. The present disclosure includes, without limitation, the following example implementations.

Some example implementations provide a test coupon comprising a first foil and a second foil; stripes of adhesive serially disposed across a width of the first foil or the second foil and coupling the first foil and the second foil to one another to form node bonds; and a first adherend coupled to the first foil and a second adherend coupled to the second foil such that the first foil and the second foil are provided between the first adherend and the second adherend, the first adherend and the second adherend being connectable to load blocks of a test apparatus capable of loading the test coupon to determine characteristics of each of the node bonds formed from the stripes of adhesive.

In some example implementations of the test coupon of any preceding or any subsequent example implementation, or any combination thereof, the first foil and the second foil comprise at least one of a thickness of between about 0.002 inches and about 0.100 inches and a width of between about 0.5 inches and about 1.0 inches.

In some example implementations of the test coupon of any preceding or any subsequent example implementation, or any combination thereof, the test coupon further comprises adhesive disposed between the first adherend and the first foil, and disposed between the second adherend and the second foil, the adhesive being configured to couple the first adherend to the first foil and the second adherend to the second foil.

In some example implementations of the test coupon of any preceding or any subsequent example implementation, or any combination thereof, the adhesive disposed between the first adherend and the first foil and disposed between second adherend and the second foil comprises a thickness of about 0.003 inches to about 0.010 inches.

In some example implementations of the test coupon of any preceding or any subsequent example implementation, or any combination thereof, the test apparatus is capable of cyclically loading the test coupon to determine durability of each of the node bonds formed from the stripes of adhesive.

In some example implementations of the test coupon of any preceding or any subsequent example implementation, or any combination thereof, the test apparatus is capable of statically loading the test coupon to determine static strength of each of the node bonds formed from the stripes of adhesive.

In some example implementations of the test coupon of any preceding or any subsequent example implementation, or any combination thereof, the stripes of adhesive are discontinuously disposed about 0.1 inches to about 2.0 inches in series along the width of the first foil or the second foil.

In some example implementations of the test coupon of any preceding or any subsequent example implementation, or any combination thereof, the test coupon is configured as a double-cantilever beam.

Some example implementations provide a method for testing node bonds comprising receiving first load data from a cyclic loading of a test coupon having foils coupled together by node bonds formed of stripes of adhesive, the cyclic loading identifying a relationship between a durability of the node bonds and a strain energy release rate of the node bonds that defines an estimated life of the node bonds of the test coupon; receiving second load data from a finite element analysis of a finite element model of a honeycomb structure comprising a honeycomb core having foils coupled together by node bonds formed of stripes of adhesive and outer panels bonded to the honeycomb core, the finite element model of the honeycomb structure being subjected to loads to determine a strain energy release rate of the node bonds of the finite element model of the honeycomb structure, the strain energy release rate determined thereby being fit to the relationship for calculating the estimated life of the node bonds of the test coupon at each of the loads; generating an equivalent damage model of a number of times a structural object encounters each of the loads over a service life of the structural object and the estimated life of the node bonds of the test coupon at each of the loads in order to determine a total damage to node bonds of a honeycomb structure in use by the structural object over the service life of the structural object, the honeycomb structure in use by the structural object comprising a honeycomb core and outer panels bonded to the honeycomb core; and determining the durability of node bonds of a test honeycomb structure having foils coupled together by node bonds formed of stripes of adhesive, the test honeycomb structure being subjected to an equivalent number of loading cycles determined by the total damage to the node bonds of the honeycomb structure in use by the structural object and an estimated service life of the structural object at a maximum load.

In some example implementations of the method of any preceding or any subsequent example implementation, or any combination thereof, receiving the first load data from the cyclic loading of the test coupon comprises receiving the first load data from fracture testing of the node bonds of the test coupon configured as a double cantilever beam, the relationship between the durability of the node bonds and the strain energy release rate of the node bonds being adapted from Paris' Law.

In some example implementations of the method of any preceding or any subsequent example implementation, or any combination thereof, receiving the second load data from the finite element analysis of the finite element model comprises receiving the second load data from application of a virtual crack closure technique on the finite element model of the honeycomb structure to compute the strain energy release rate at cracks about the honeycomb structure formed in response to the loads.

In some example implementations of the method of any preceding or any subsequent example implementation, or any combination thereof, generating the equivalent damage model comprises applying Miner's Rule to the number of times the structural object encounters each of the loads over the service life of the structural object and the estimated life of the node bonds of the test coupon at each of the loads.

In some example implementations of the method of any preceding or any subsequent example implementation, or any combination thereof, the structural object is an aircraft, and generating the equivalent damage model comprises generating the equivalent damage model to determine the total damage to the node bonds of the honeycomb structure in use by the aircraft relative to the number of times the aircraft lands at destinations having ambient temperatures different from a cure temperature of the bond between the honeycomb core and the outer panels of the honeycomb structure over the service life of the aircraft.

In some example implementations of the method of any preceding or any subsequent example implementation, or any combination thereof, determining durability of the node bonds of the test honeycomb structure comprises subjecting the honeycomb structure to the equivalent number of loading cycles determined by the total damage to the node bonds of the honeycomb structure in use by the structural object and the estimated life of the node bonds of the test coupon at the maximum load of a standard load cycle, the estimated life of the node bonds of the test coupon at the maximum load of the standard load cycle being calculated from application, to the relationship, of a strain energy release rate of the node bonds of the finite element model of the honeycomb structure at the maximum load of the standard load cycle.

In some example implementations of the method of any preceding or any subsequent example implementation, or any combination thereof, receiving the second load data from the finite element analysis of the finite element model of the honeycomb structure comprises receiving the second load data from the finite element analysis of the finite element model of the honeycomb structure comprising carbon fiber reinforced plastic outer panels bonded on opposing surfaces of the honeycomb core having aluminum foils, the finite element model of the honeycomb structure being subjected to thermal loads to determine a strain energy release rate of the node bonds of the finite element model of the honeycomb structure, the strain energy release rate determined thereby being fit to the relationship for calculating the estimated life of the node bonds of the test coupon at each of the thermal loads.

In some example implementations of the method of any preceding or any subsequent example implementation, or any combination thereof, receiving the first load data from the cyclic loading of the test coupon comprises receiving the first load data from the cyclic loading of the test coupon having two foils each comprising a thickness of about 0.002 inches to about 0.100 inches and a width of about 0.5 inches to about 1.0 inches, the two foils being coupled together by the node bonds formed of the stripes of adhesive.

Some example implementations provide an apparatus for testing node bonds, the apparatus comprising a processor and a memory storing executable instructions that, in response to execution by the processor, cause the apparatus to at least perform the method of any preceding example implementation, or any combination thereof.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described the disclosure in general terms, reference will now be made to the accompanying drawings, which are not necessarily drawn to scale, and wherein:

DETAILED DESCRIPTION

Figure 1A:
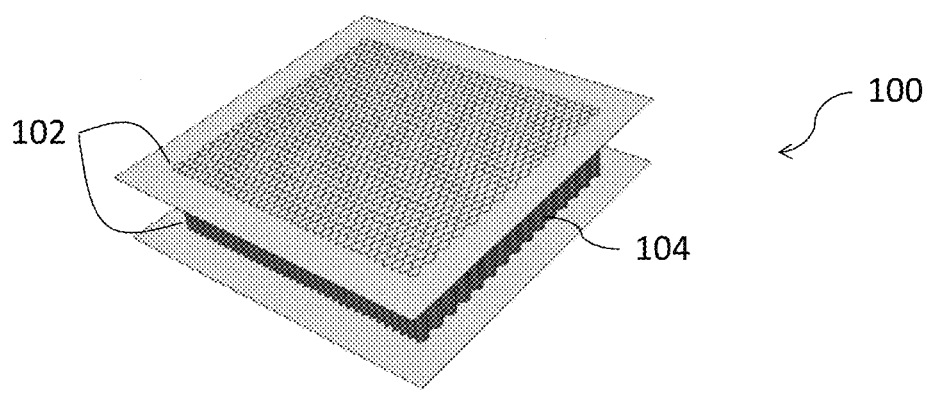
FIGS. 1A and 1B are respectively a perspective view and a detailed view of a honeycomb structure according to exemplary aspects of the disclosure provided herein.

Some implementations of the present disclosure will now be described more fully hereinafter with reference to the accompanying drawings, in which some, but not all variations of the disclosure are shown. Indeed, variations of the disclosure may be embodied in many different forms and should not be construed as limited to the examples set forth herein; rather, these are provided so that this disclosure will be thorough and complete, and will fully convey the scope of the disclosure to those skilled in the art. Further, for example, reference may be made herein to values of or relationships between components, parameters, properties, variables or the like. These and other similar values or relationships may be absolute or approximate to account for variations that may occur, such as those due to engineering tolerances or the like. Like reference numerals refer to like elements throughout.

FIG. 1A illustrates a honeycomb structure 100 according to one example of the present disclosure. The honeycomb structure 100 illustrated in FIG. 1A may comprise a composite panel having outer panels 102 bonded to opposing surfaces of an inner honeycomb core 104. In some aspects, the honeycomb core 104 may be relatively thick compared to the outer panels 102. For example, in some instances, the honeycomb core 104 may be approximately 5 inches thick, while the outer panels 102 may be approximately 0.05 inches thick.

Figure 1B:
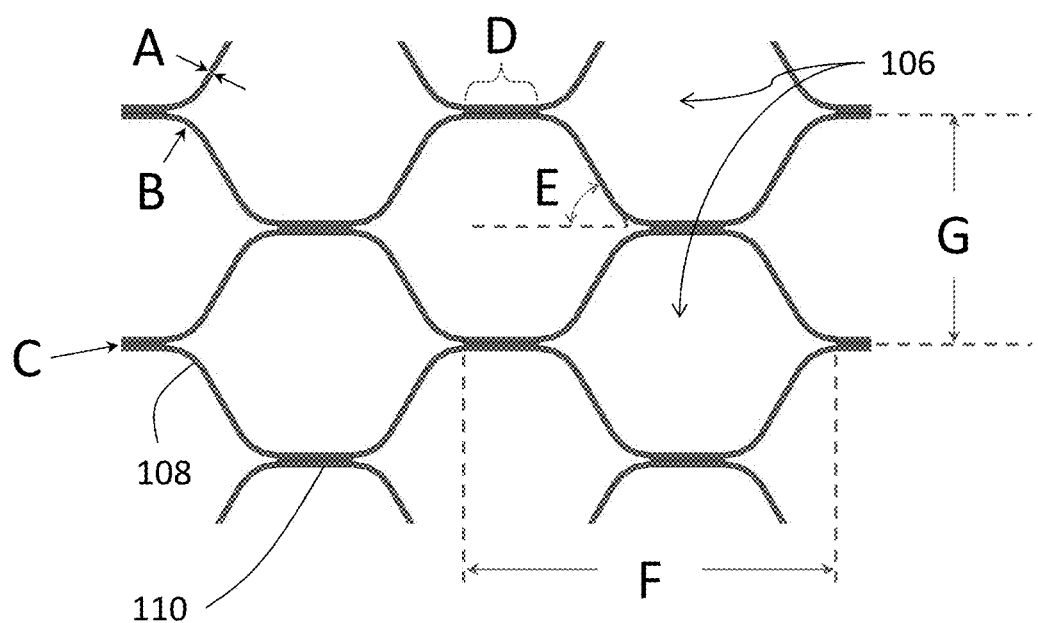

In some aspects, the honeycomb core 104 may comprise a plurality of hollow celled structures. FIG. 1B illustrates a detailed view of hollow cells 106 of an exemplary honeycomb core (e.g., honeycomb core 104, FIG. 1A). In FIG. 1B, each of the hollow cells 106 may be formed from two layers of thin material 108 coupled together by stripes of adhesive 110 serially disposed across a width of either the first or second layers of the thin material 108. The stripes of adhesive 110 may be cured by, for example, heat and/or pressure. Once cured, outermost layers of the thin material 108 of the honeycomb core 104 may be pulled in opposite directions to expand each of the hollow cells 106 into a substantially hexagonal shape.

In some aspects, the stripes of adhesive 110 may form "node bonds" to couple two transversely adjacent layers of the thin material 108 together. Durability of the node bonds formed by the stripes of adhesive 110 may be impacted by degradation of the node bonds 110 due to, in one aspect, loading thereof. For example, thermal loading, thermomechanical loading, mechanical loading, etc., may cause the node bonds formed from the stripes of adhesive 110 to degrade over time.

In some aspects, a geometry of each hollow cell 106 may impact durability during loading of the node bonds formed from the stripes of adhesive 110. The geometry of each hollow cell 106 may, in some aspects, be shown by a variety of parameters such as, for example, foil thickness A, foil bend radius B, node bondline thickness (between foil layers) C, intact node bond length D, cell wall angle E, cell spacing along foil F, cell spacing transverse to foil G, etc. Some geometry may cause the node bonds 110 to be more susceptible to failure than others.

Likewise, a material from which the outer panels 102 and/or the honeycomb core 104 is composed of may also affect the durability of the node bonds 110 from applied loads. For example, the outer panels 102 and/or the thin foils 108 of the honeycomb core 104 may be composed of a metallic or a nonmetallic material, such as an aluminum, an aluminum alloy, a fiber glass, a meta-aramid (e.g., NOMEX®), a carbon composite, and the like, while the stripes of adhesive 110 may be stripes of epoxy, rubber, polyamide, etc., that are cured by heat and/or pressure. In some aspects, the outer panels 102 and the honeycomb core 104 are composed of different materials having a thermal mismatch. More particularly, curing of the bond between the outer panels 102 and the honeycomb core 104 where the outer panels 102 and the honeycomb core 104 are composed of different materials may result in residual thermal stresses that are exacerbated when the cured honeycomb structure 100 is subjected to thermal loads. As such, thermal loads applied to the honeycomb structure 100 having such a thermal mismatch may result in significant degradation of the node bonds 110. For example, where the outer panels 102 comprise a carbon-fiber reinforced composite and the thin film 108 of the honeycomb core 104 comprises aluminum, a durability of the node bonds 110 over a service life of the honeycomb structure 100 may be significantly affected.

Accordingly, the present disclosure provides for test coupons having node bonds similar to those described hereinabove, methods for testing the node bonds, and related apparatuses that provide for testing durability of the node bonds when loaded.

Figure 2A:
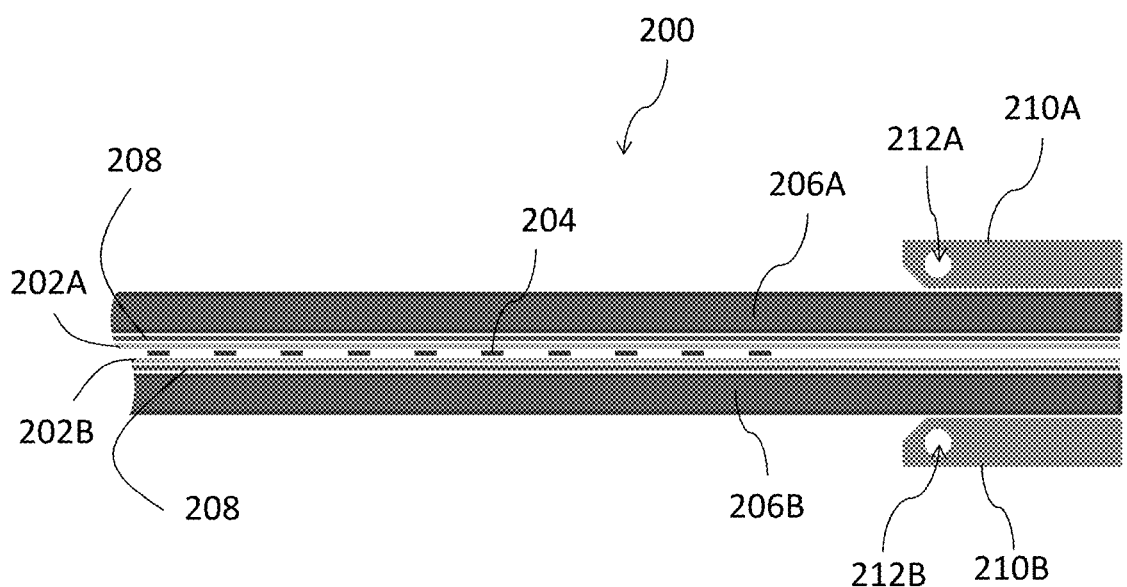
FIGS. 2A and 2B are a side view of a test coupon in respectively an unloaded state and a loaded state according to exemplary aspects of the disclosure provided herein.

FIG. 2A illustrates a test coupon 200 according to one example of the present disclosure. The test coupon 200 in FIG. 2A is in an unloaded state, such that no load is applied to the test coupon 200. The test coupon 200 may comprise a first foil 202A and a second foil 202B. The first foil 202A and the second foil 202B, in some aspects, comprise at least one of a thickness of between about 0.002 inches and about 0.100 inches and a width of between about 0.5 inches and about 1.0 inches. In this manner, the foils 202A, 202B may be considered "thin" foils similar to the thin foils 108 illustrated in FIG. 1B. In other aspects, the thin foils 202A, 202B may comprise an aluminum or aluminum alloy; although other materials are also contemplated. As illustrated in FIG. 2A, the thin foils 202A, 202B may be substantially planar relative to a length and/or width of the test coupon 200.

The test coupon 200 also comprises stripes of adhesive 204 serially disposed across a width of the first foil 202A or the second foil 202B. More particularly, the stripes of adhesive 204 extend across an entirety or a substantial entirety of the width of one of the first foil 202A or the second foil 202B. In some aspects, the stripes of adhesive may be cured to form node bonds coupling the first and second foils 202A, 202B to one another. The node bonds formed by the stripes of adhesive 204 are similar in some aspects to those described above in reference to FIGS. 1A, 1B.

In some aspects, more than one stripe of adhesive 204 may be disposed across the width of one of the first foil 202A or the second foil 202B. In this aspect, for example, the stripes of adhesive 204 are discontinuously disposed in series along the width of the first or the second foil 202A, 202B. In this manner, the stripes of adhesive 204 may be disposed about 0.1 inch to about 2.0 inches apart from one another across a width of the first or the second foil 202A, 202B.

The test coupon 200 further comprises, in some aspects, a first adherend 206A coupled to the first foil 202A and a second adherend 206B coupled to the second foil 202B such that the first foil 202A and the second foil 202B are provided between the first adherend 206A and the second adherend 206B. The first adherend 206A and the second adherend 206B may comprise a non-metallic material, such as, for example, a polymer composite. In some aspects, the first adherend 206A and the second adherend 206B may be considered "thin" adherends, such that the adherends comprise a thickness of about 0.06 inches to about 0.120 inches. As such, the thin adherends illustrated in FIGS. 2A, 2B differ from "thick" adherends comprising a thickness of about 0.25 inches to about 0.75 inches which are used in typical fracture testing.

In some aspects, the test coupon 200 further comprises adhesive 208 disposed between the first adherend 206A and the first foil 202A and disposed between the second adherend 206B and the second foil 202B to couple or bond the first adherend 206A to the first foil 202A and the second adherend 206B to the second foil 202B. The adhesive 208 comprises, in some aspects, a low cure temperature adhesive such as, for example, an epoxy, a rubber, a polymide, etc., applied with a thickness of about 0.003 inches to about 0.01 inches and cured at about 250 degrees Fahrenheit or lower. Accordingly, the use of a low cure temperature adhesive is to prevent residual thermal stresses between the first foil 202A and the second foil 202B and the respective adherends 206A, 206B in order to minimize failure of the bond between the first foil 202A and the second foil 202B and the adherends 206A, 206B during loading.

The test coupon 200 still further comprises, in some aspects, load blocks of a test apparatus. For example, a first loading block 210A may be connected to the first adherend 206A and a second loading block 210B may be connected to the second adherend 206B. In some aspects, the first loading block 210A and the second loading block 210B may be configured to receive a load from a test apparatus (e.g., test apparatus 304, FIG. 3) capable of loading the test coupon 200 to determine characteristics of the node bonds formed from the stripes of adhesive 204 of the test coupon 200. For example, the test apparatus is capable of performing fracture testing on the test coupon 200 per ASTM D6115 by cyclically loading the test coupon 200 in order to determine a durability of each of the node bonds formed from the stripes of adhesive 204. In another example, the test apparatus may be capable of performing static fracture testing on the test coupon 200 per ASTM D5528 by statically loading the test coupon 200 in order to determine loading peaks and associated fracture toughness values of the node bonds formed from the stripes of adhesive.

Figure 2B:
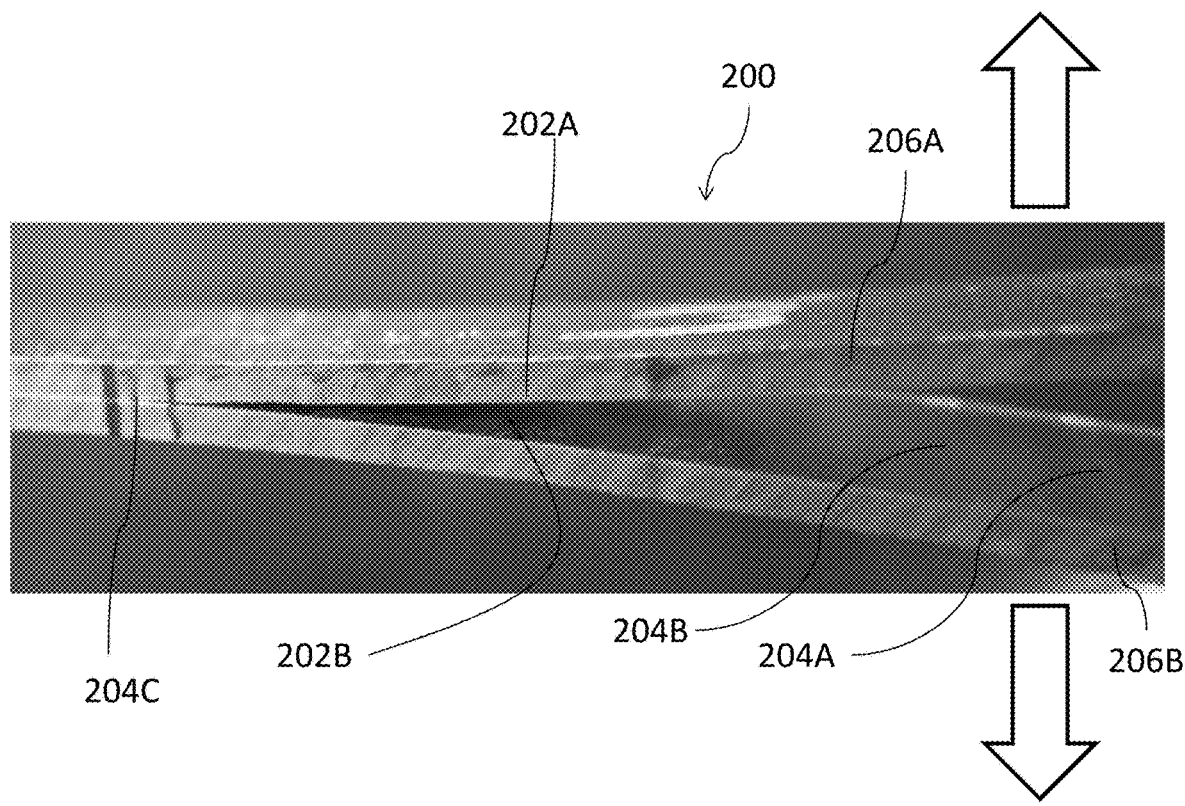
Figure 3:
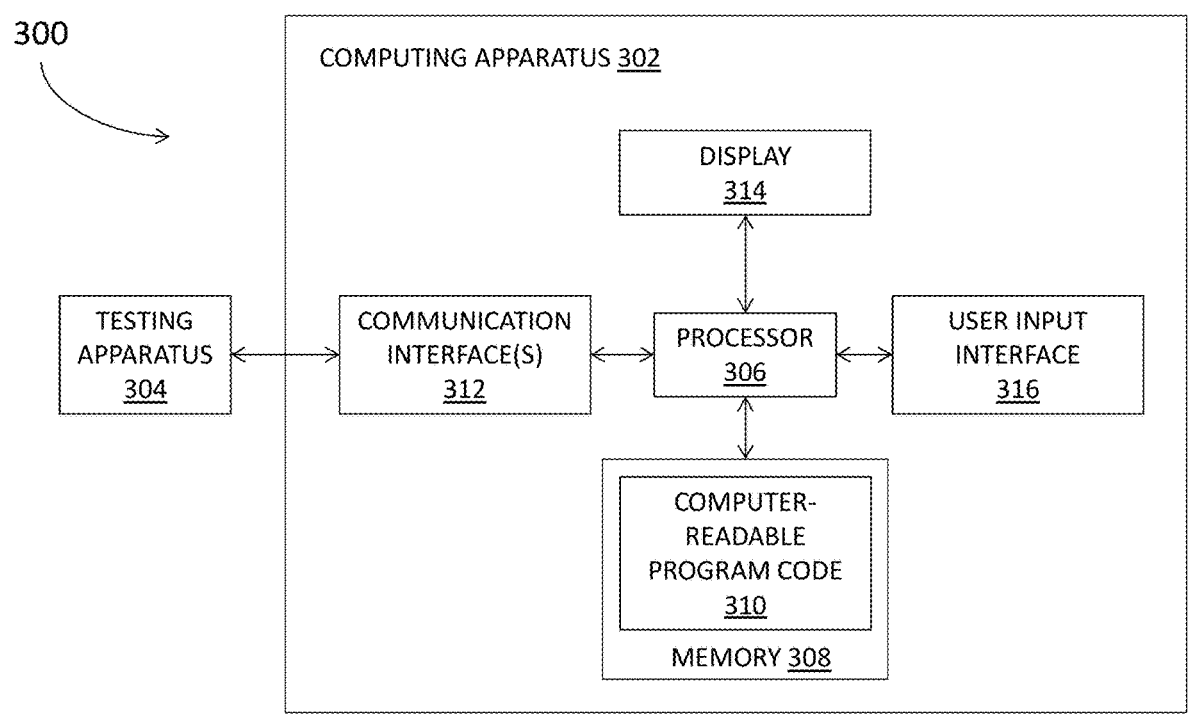
FIG. 3 is a schematic of a system for testing node bonds according to exemplary aspects of the disclosure provided herein.

FIG. 2B illustrates the test coupon 200 in a loaded state, such that a load may be applied to the test coupon 200 via loading blocks of a test apparatus (e.g., apparatus 304, FIG. 3). More particularly, in FIG. 2B, the test coupon 200 is configured as a double cantilevered beam such that a load may be applied to the first loading block 210A about an opening 212A defined by the first loading block and the second loading block 210B about an opening 212B defined by the second loading block (not shown in FIG. 2B) in a direction substantially transverse to a width and/or length of the test coupon 200. The arrows provided in FIG. 2B illustrate the direction of the load. In such aspects, the load may be applied cyclically, statically, or a combination of both, at mechanical loads of about 1 pound to about 100 pounds.

Where the load is applied cyclically, the load may be applied and removed from the test coupon 200. One cycle of the load may be constituted by application and removal of the load. As each loading cycle is applied to the test coupon 200, in some instances, the node bonds formed from the stripes of adhesive 204 may begin to degrade until complete degradation is reached. Within the scope of this application, "degrade" refers to the fracture of a node bond between two layers of foil.

Where there are multiple stripes of adhesive 204 applied to either of the thin foils 202A or 202B, more than one node bond may be formed. In such a configuration, the node bonds may begin to degrade in series, beginning with the node bond closest to the loading end. For example and as illustrated in FIG. 2B, multiple stripes of adhesive forming multiple node bonds between the first foil 202A and the second foil 202B are shown. In this example, the node bond formed from the stripe of adhesive 204A, may thus, degrades prior to the node bond formed from the stripe of adhesive 204B. In FIG. 2B, the node bonds formed from stripes of adhesive, such as 204C, farther away from the loading end are illustrated as not yet completely degraded, such that the first foil 202A and the second foil 202B may remain coupled together.

FIG. 3 illustrates a system 300 for testing node bonds. The system 300, in some aspects, may comprise a computing apparatus 302 capable of receiving data results from loading of a test coupon (e.g., test coupon 200, FIGS. 2A, 2B) by a test apparatus 304. In exemplary implementations of the computing apparatus 302, the computing apparatus 302 may be implemented by various means including hardware, alone or under direction of one or more computer programs from a computer-readable storage medium. In some examples, one or more apparatuses may be provided that are configured to function as or otherwise implement the computing apparatus 302 shown and described herein. In examples involving more than one apparatus, the respective apparatuses may be connected to or otherwise in communication with one another in a number of different manners, such as directly or indirectly via a wired or wireless network or the like.

FIG. 3 illustrates one exemplary implementation of the computing apparatus 302. Generally, an apparatus of example implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, a processor 306 (e.g., processor unit) connected to a memory 308 (e.g., storage device).

The processor 306 is generally any piece of computer hardware that is capable of processing information such as, for example, data, computer programs and/or other suitable electronic information. The processor 306 may be composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 308 (of the same or another apparatus).

The processor 306 may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory 308 may be generally any piece of computer hardware that is capable of storing information such as, for example, data, computer programs (e.g., computer-readable program code 310) and/or other suitable information either on a temporary basis and/or a permanent basis. The memory 308 may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 308, the processor 306 may also be connected to one or more interfaces 312 for displaying, transmitting and/or receiving information. The interfaces may include a communications interface (e.g., communications unit) and/or one or more user interfaces. The communications interface 312 may be configured to transmit and/or receive information, such as to and/or from other apparatus(es), network(s) or the like. For example, the communications interface 312 is configured to receive loading data from loading of a test coupon, e.g., test coupon 200, FIG. 2A, by the test apparatus 304. In this instance, the first loading data comprises data such as, but not limited to, durability of node bonds, SERR measured at each node bond, load peaks, etc. In some aspects, the communications interface 312 may be configured to transmit and/or receive information by physical (wired) and/or wireless communications links. Examples of suitable communication interfaces include a network interface controller (NIC), wireless NIC (WNIC) or the like.

In other aspects, the user interfaces 314 may include a display 314 and/or one or more user input interfaces 316 (e.g., input/output unit). The display 314 may be configured to present or otherwise display information to a user, suitable examples of which include a liquid crystal display (LCD), light-emitting diode display (LED), plasma display panel (PDP) or the like.

The user input interfaces 316 may be wired or wireless, and may be configured to receive information from a user into the apparatus 302, such as for processing, storage and/or display. Suitable examples of user input interfaces 316 include a microphone, image or video capture device, keyboard or keypad, joystick, touch-sensitive surface (separate from or integrated into a touchscreen), biometric sensor or the like. The user interfaces 316 may further include one or more interfaces for communicating with peripherals such as printers, scanners or the like.

As indicated above, program code instructions may be stored in memory, and executed by a processor, to implement functions of the systems, subsystems and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, the apparatus 302 may include a processor 306 and a computer-readable storage medium or memory 308 coupled to the processor, where the processor is configured to execute computer-readable program code 310 stored in the memory 308. It will also be understood that one or more functions, and combinations of functions, may be implemented by special purpose hardware-based computer systems and/or processors which perform the specified functions, or combinations of special purpose hardware and program code instructions.

Still referring to FIG. 3, in some aspects, the testing apparatus 304 comprises a load frame with an actuator that may be configured to apply the mechanical load and measure the applied load displacement. In some aspects, the testing apparatus 304 also comprises a load cell or other measurement device that may be configured to measure the applied load with more precision than the load frame, a test fixture for coupling to the test coupon, and grips for retaining the test fixture. A computing apparatus other than computing apparatus 302 may also be associated with the testing apparatus 304 to control the testing apparatus 304 and/or record the output measurements.

As described herein, in some aspects, the computing apparatus 302 or otherwise, a separate computing apparatus associated with the testing apparatus 304, may be configured to receive first load data from cyclic loading of a test coupon (e.g., test coupon 200, FIG. 2A) by the test apparatus 304. In other aspects, for example, the test coupon may be subjected to static loading or a combination of static and cyclic loading, such that the computing apparatus 302 or the like may be configured to receive first load data from the static loading or a combination of the static loading and the cyclic loading of a test coupon. The computing apparatus 302 is then configured to process the first load data. For example, processing the first load data may comprise analyzing the first load data to identify trends, relationships, patterns, etc. Optionally, the computing apparatus 302 may be configured to display the processing the results. For example, and as illustrated in FIG. 4, a graphical representation 400 of first load data from cyclic loading of a test coupon (e.g., test coupon 200, FIGS. 2A, 2B) may be displayed by the computing apparatus 302.

Figure 4:
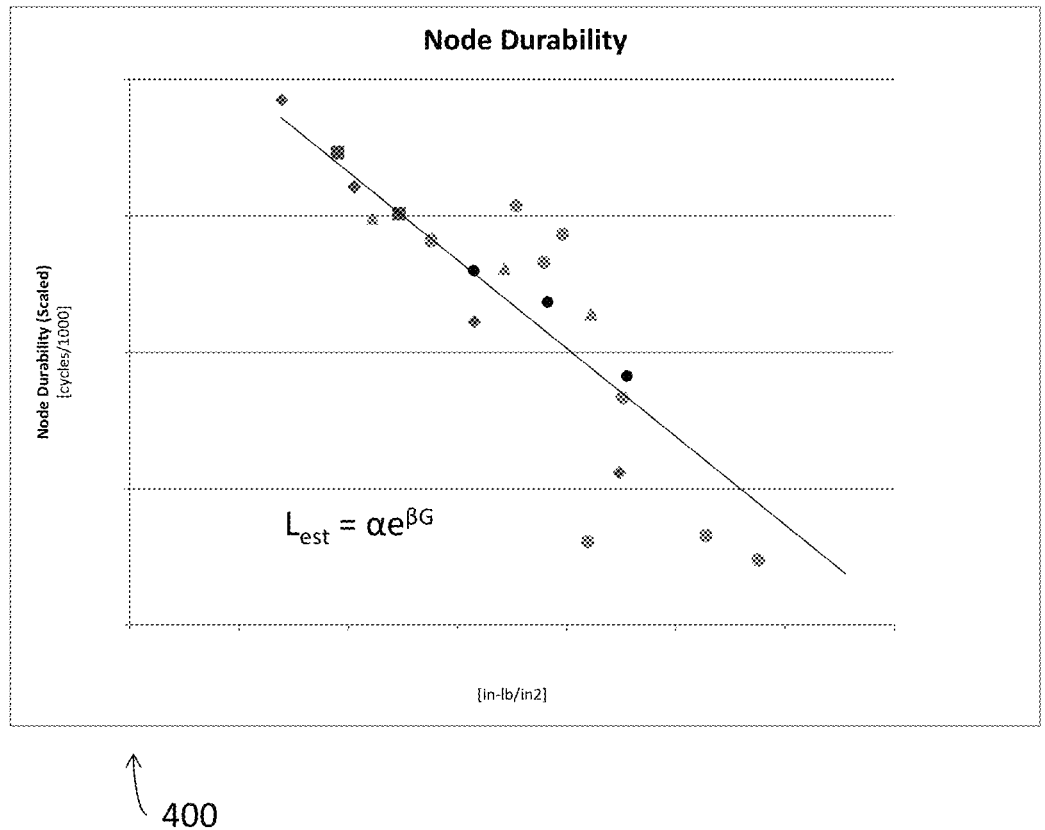
FIG. 4 is a graphical representation of node durability of a test coupon according to exemplary aspects of the disclosure provided herein.

In FIG. 4, the graphical representation 400 is a log-log plot, which may graphically display the first load data collected from the loading of the test coupon, i.e., a durability of the node bonds and a strain energy release rate (SERR) measured during complete degradation of each node bond. The computing apparatus 302 may also process the first load data to identify a relationship between the durability of the node bonds and the SERR. For example, and as illustrated in FIG. 4, the relationship between the durability of the node bonds and the SERR is defined by a fit line (EQUATION 1) based on a fatigue crack growth model (e.g., Paris' Law), which defines an estimated life of the node bonds of the test coupon:

$$L_{est} = \alpha e^{\beta G}, \quad \text{EQUATION 1}$$

In some aspects, α and β are values that may be determined based on the different materials and configurations of the honeycomb core being tested. G may be the SERR measured during complete degradation of a node bond.

In other aspects, the computing apparatus 302 may be configured to receive first load data from static loading of a test coupon (e.g., test coupon 200, FIG. 2A). The computing apparatus 302 is configured to process the first load data and, optionally, graphically display the first load data from the static loading of the test coupon. For example, processing the first load data from the stating loading of the test coupon may comprise identifying relationships between load peaks and fracture toughness values (e.g., crack length) for individual node bonds.

In some aspects, the computing apparatus 302 may be configured to receive and, optionally, store, or otherwise compute, second load data. For example, the computing apparatus 302 may be configured to receive the second load data from another computing platform, testing apparatus, and the like and utilize the data accordingly. Otherwise, in another example, the computing apparatus 302 may be configured to process raw data (e.g., geometry of an exemplary honeycomb structure, materials, etc.) such that the second load data is then stored at the computing apparatus 302.

The second load data may comprise, in some aspects, data from a finite element analysis of a finite element model of a honeycomb structure. For example, measurements for a physical instance of the honeycomb structure (e.g., raw data) may be used to simultaneously generate a plot of a corresponding dataset of the measurements for the physical instance of the honeycomb structure for comparison with an interpolated dataset. Accordingly, the second load data may comprise values determined by the finite element analysis (e.g. nodal datasets), values derived from physical measurements of the honeycomb structure, and/or plots generated by the computing apparatus 302 or another associated apparatus for use in comparing values for the honeycomb structure in which at least a portion of the values may be either the values determined by the finite element analysis (e.g. nodal datasets) or the values derived from physical measurements of the honeycomb structure.

Figure 5:
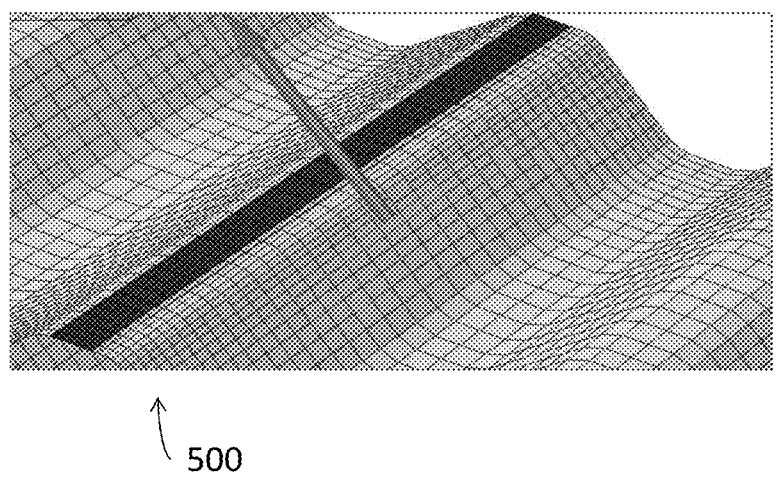
FIG. 5 is a screenshot of a finite element analysis of a finite element model of a honeycomb structure according to exemplary aspects of the disclosure provided herein.

FIG. 5 illustrates a finite element model of a honeycomb structure 500. The finite element model of the honeycomb structure 500. The finite element model may be a plot of a dataset corresponding to measurements for a physical instance of a honeycomb structure. In some aspects, the measurements for the physical instance of a honeycomb structure are similar to those described herein with regard to FIGS. 1A, 1B. For example, cell geometry of each hollow cell of the finite element model of the honeycomb structure 500 comprises cell geometry averaged from manufactured honeycomb structures of varying geometries, densities, and/or materials. Accordingly, the finite element model of the honeycomb structure 500 may comprise a honeycomb core having foils coupled together by node bonds formed of stripes of adhesive and outer panels bonded to the honeycomb core.

In some aspects, the finite element model of the honeycomb structure 500 may be subjected to various tests and/or analyses. Fracture mechanic characteristics of the finite element model of the honeycomb structure 500 may be measured and observed as the finite element model of the honeycomb structure 500 is subjected to loads. In some aspects, for example, virtual crack closure technique (VCCT) is performed during thermal loading of the finite element model of the honeycomb structure 500 to measure SERR at a crack tip along a centerline of a hollow cell. In this example, a running load in a wall of the hollow cell may also be measured and recorded.

In some aspects, a different thermal load is applied to the finite element model of the honeycomb structure 500, where each thermal load experienced by the honeycomb structure is variably biased. For example, each thermal load ($\Delta T$) may be recorded. In other aspects, a different mechanical load is applied to the finite element model of the honeycomb structure 500 and is recorded. SERR of the node bonds of the finite element model of the honeycomb structure 500 may also be measured from the loading of the finite element model of the honeycomb structure 500. For example, the SERR may be measured at the crack tips about the honeycomb structure formed in response to the thermal loads ($G_{I\_APP}$). In another example, the SERR may be determined from the interpolated dataset ($G_{I\_LIN}$). Regardless, the SERR for the node bonds of the finite element model of the honeycomb structure 500 may be obtained by or transmitted to the computing apparatus 302, or may be processed by the computing apparatus 302, itself.

The computing apparatus 302 may, in some aspects, receive the second load data or otherwise retrieve it from storage and fit the second load data to the relationship defined by EQUATION 1 for calculating the estimated life of the node bonds of the test coupon at each of the applied loads. In some aspects, the estimated life $L_{EST}$ of the node bonds of the test coupon is calculated at each applied thermal load, which takes into account any thermal mismatch between the materials of the honeycomb core and the outer panels. More particularly, the estimated life of the node bonds is calculated from the interpolated SERR values, which are impacted by residual stresses caused by the thermal differential between the materials of the honeycomb core and the outer panels.

In some aspects, the computing apparatus 302 may be configured to retrieve data stored in a data storage device associated with the computing apparatus 302. For example, a data repository storing service data regarding a distribution of temperature shifts experienced by a structural object in use, the structural object having a honeycomb structure, is associated with the computing apparatus 302. Regardless, in these examples, the computing apparatus 302 may be able to retrieve the service data and process it in any manner of ways.

Figure 6:
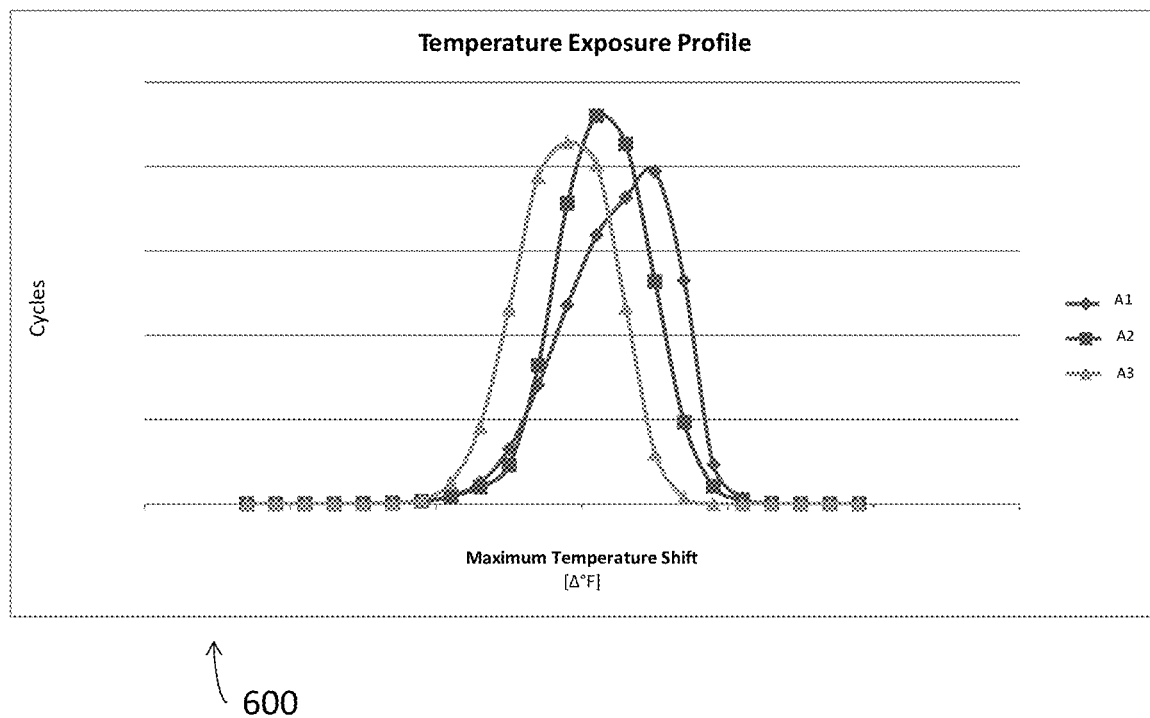
FIG. 6 is a graphical representation of a temperature exposure profile of a structural object according to exemplary aspects of the disclosure provided herein.

One such way is provided in FIG. 6. In FIG. 6, the service data may be retrieved and/or processed to provide a graphical representation 600 of a temperature exposure profile based on a number of times a structural object encounters each of the thermal loads, such as those applied during the finite element analysis to the finite element model of the honeycomb structure 500, over a service life of the structural object. As used in this context, the number of times the structural object encounters the thermal loads may be measured in terms of cycles.

In a more particular example, FIG. 6 may be a graphical representation 600 of a temperature exposure profile based on a number of times an aircraft lands at destination airports having ambient temperatures different from a cure temperature of the bond between outer panels and a honeycomb core of a honeycomb structure in use by the aircraft over the service life (in terms of flights) of the aircraft. In other examples, the structural object may be a helicopter, spacecraft, truck, etc., having a honeycomb structure in use thereby.

Still referring to FIG. 6, it may be noted that the graphical representation 600 may display service data from many different structural objects using a honeycomb structure. For example, FIG. 6 illustrates a first generic structural object (A1), a second generic structural object (A2), and a third generic structural object (A3).

In some aspects, the computing apparatus 302 may be configured to process the first load data, the second load data, and the service data. In these instances, the data may be analyzed through the following steps to determine the durability of node bonds of a test honeycomb structure having foils coupled together by node bonds formed of stripes of adhesive, the test honeycomb structure being subjected to an equivalent number of loading cycles ($N_{EQUIV}$) determined by the total damage ($d_{TOTAL}$) to the node bonds of the honeycomb structure in use by the structural object and an estimated life of the node bonds of the test coupon at a maximum load ($L_{EST\_STD}$). For example, where the service data comprises data regarding a number of times (cycles) an aircraft experiences thermal loads, the first data and the second data may be processed to determine an equivalent number of loading cycles $N_{EQUIV}$ determined by the total damage $d_{TOTAL}$ to the node bonds of the honeycomb structure in use by the aircraft and an estimated life of the node bonds of the test coupon at a maximum load $L_{EST\_STD}$ in a standard load cycle.

In a first step, the computing apparatus 302 may process the service data by taking an average of a minimum and maximum temperature at a destination airport and calculating a temperature shift $\Delta T$ from a cure temperature of the bond between the honeycomb core and the outer panels of the honeycomb structure in use by the aircraft, where the cure temperature in this instance is 350 degrees Fahrenheit. In some aspects, the temperature shifts $\Delta T$ computed by the computing apparatus 302 may correspond to the temperature shifts analyzed in the finite element analysis of the finite element model of the honeycomb structure 500 illustrated in FIG. 5. Thus, the temperature shifts $\Delta T$ calculated by the computing apparatus 302 may range from a maximum temperature shift to a minimum temperature shift, the maximum temperature shift being the theoretically coldest ambient temperature at a destination airport.

In a second step, the computing apparatus 302 may process the service data by organizing or otherwise differentiating a number of flights in which the honeycomb structure in use by an aircraft encounters a particular temperature shift $\Delta T$.

In a third step, the computing apparatus 302 may process the second load data to determine an estimated load $G_{EST}$ and an estimated life $L_{EST}$ of a node bond at each of the loads applied to the finite element model of the honeycomb structure 500 illustrated in FIG. 5. In some aspects, $G_{EST}$ is equivalent to the $G_{LIN}$ from the interpolated dataset. Thus, the estimated life $L_{EST}$ is the estimated life of the node bonds at each load (i.e., temperature shift $\Delta T$) based on EQUATION 1 and incorporating the $G_{EST}$.

In a fourth step, the computing apparatus 302 may determine the damage caused at each temperature shift $\Delta T$ (segment) experienced by the structural object or $d_{SEG}$. As used herein, "damage" refers to a total degradation of the node bonds of a honeycomb structure. For example, where the structural object comprises an aircraft, the damage caused at each temperature shift or segment $d_{SEG}$, is determined relative to the number of times the aircraft lands at destinations having ambient temperatures different from a cure temperature of the bond between the honeycomb core and the outer panels of the honeycomb structure over the service life of the aircraft. In this manner, the computing apparatus 302 may be configured to generate an equivalent damage model. The equivalent damage model may comprise, in some aspects, an application of Miner's Rule, such that segment damage $d_{SEG}$ may be determined by EQUATION 2:

$$d_{seg} = \text{flights in segment}/L_{EST} \quad \text{EQUATION 2}$$

In other aspects, the equivalent damage model of EQUATION 2 may be modified to calculate damage caused at each segment $d_{SEG}$ caused by cyclic mechanical loading of the honeycomb structure in use by the aircraft. The calculations for $d_{SEG}$ at each mechanical load may be summed to calculate accumulated damage to the honeycomb structure in use by the structural object due to cyclic mechanical loading of the honeycomb structure. Other applications of the equivalent damage model are also contemplated.

In a fifth step, the computing apparatus 302 may be configured to process the damage at each segment $d_{SEG}$ to determine a total damage to the node bonds $d_{TOTAL}$ of the honeycomb structure in use by the structural object. For example, the total damage $d_{TOTAL}$ may be determined by summing the values for $d_{SEG}$ at each load.

In a sixth step, the computing apparatus 302 may be configured to determine an equivalent number of loading cycles $N_{EQUIV}$ for cyclic loading of a test honeycomb structure, in a laboratory setting. In some aspects, the equivalent number of loading cycles $N_{EQUIV}$ may be determined by a total damage $d_{TOTAL}$ to node bonds of the honeycomb structure in use by the structural object and the estimated life of the node bonds of the test coupon at a maximum load $L_{EST\_STD}$. That is, rather than cycling thermal loads on a honeycomb structure in a laboratory setting for a same number of cycles as that to which a honeycomb structure in use by a structural object experiences, a number of equivalent mechanical cycles $N_{EQUIV}$ that impart a same total damage $d_{TOTAL}$ to the test honeycomb structure in the laboratory setting may be determined, where the number of equivalent mechanical cycles $N_{EQUIV}$ is less than what the honeycomb structure in use by the structural object experiences.

In these aspects, the computing apparatus 302 may be configured to determine an estimated life $L_{EST\_STD}$ of the node bonds of the test coupon from application of the maximum load from a standard load cycle. In some instances, the maximum load is a maximum thermal load of a standard thermal cycle, which can be recreated in a laboratory environment. As such, the maximum thermal load occurs at a greatest shift in temperature in the standard thermal cycle $\Delta T_{STD}$ from a cure temperature of the bond between the honeycomb core and the outer panels. For example, the greatest temperature $\Delta T_{STD}$ shift occurs at a theoretical lowest temperature of a thermal cycle, −65 degrees Fahrenheit. In this example, where the cure temperature of the bond between the honeycomb core and the outer panels is 350 degrees Fahrenheit, the temperature shift $\Delta T_{STD}$ is −415 degrees Fahrenheit. At this temperature shift $\Delta T_{STD}$, the maximum thermal load or $G_{I\_LIN}$ may be the SERR determined from the interpolated dataset. Accordingly, by inserting these values into EQUATION 1, the estimated life $L_{EST\_STD}$ of the node bonds of the test coupon at the maximum thermal load of the standard thermal load cycle may be determined.

The estimated life $L_{EST\_STD}$ may then be used to determine the equivalent number of loading cycles for loading of the test coupon $N_{EQUIV}$. In some aspects, for example, the estimated life $L_{EST\_STD}$ is related to the total damage $d_{TOTAL}$ in EQUATION 3:

$$N_{EQUIV} = L_{EST\_STD} d_{TOTAL} \qquad \text{EQUATION 3}$$

where $L_{EST\_STD}$=cycles at a maximum temperature shift from a cure temperature in a standard thermal cycle $d_{TOTAL}$=a summation of all the values for $d_{SEG}$ The computing apparatus 302 may also configured to determine the equivalent number of loading cycles $N_{EQUIV}$ equivalent to the service thermal cycle, a mechanical cycle, or a thermomechanical cycle experienced by the structural object, where a purely mechanical load is applied to the finite element model of the honeycomb core 500. Thus, once the equivalent number of loading cycles $N_{EQUIV}$ is determined, a test honeycomb structure may be subjected to the determined, equivalent number of loading cycles $N_{EQUIV}$. In some aspects, the test honeycomb structure may be a honeycomb structure having a design similar to the honeycomb structure 100 in FIG. 1A, e.g., having a honeycomb core and outer panels bonded thereto. Regardless, the honeycomb structure may comprise foils coupled together by node bonds formed of stripes of adhesive, the node bonds degrading over each loading cycle that the test honeycomb structure is subjected to until the node bonds incur the total damage $d_{TOTAL}$ equivalent to the total damage to the node bonds $d_{TOTAL}$ of the honeycomb structure in use by the structural object.

In a seventh step, in some aspects, the computing apparatus 302 may be configured to determine the durability of node bonds of the test honeycomb structure after the test honeycomb structure is submitted to the equivalent number of loading cycles $N_{EQUIV}$. In this manner, the determined durability of the node bonds of the test honeycomb structure may be analogous to the durability of a honeycomb structure in use by a structural object at the end of its service life, without having to subject the test honeycomb structure to the number of cycles experienced by the structural object over its service life.

In other aspects, the computing apparatus 302 may be configured to predict a number of cycles at which a node bond of a test honeycomb structure will fail and use such a prediction to provide a margin of safety between failure of the node bond of the test honeycomb structure and a service life of a honeycomb structure in use by a structural object.

Figure 7:
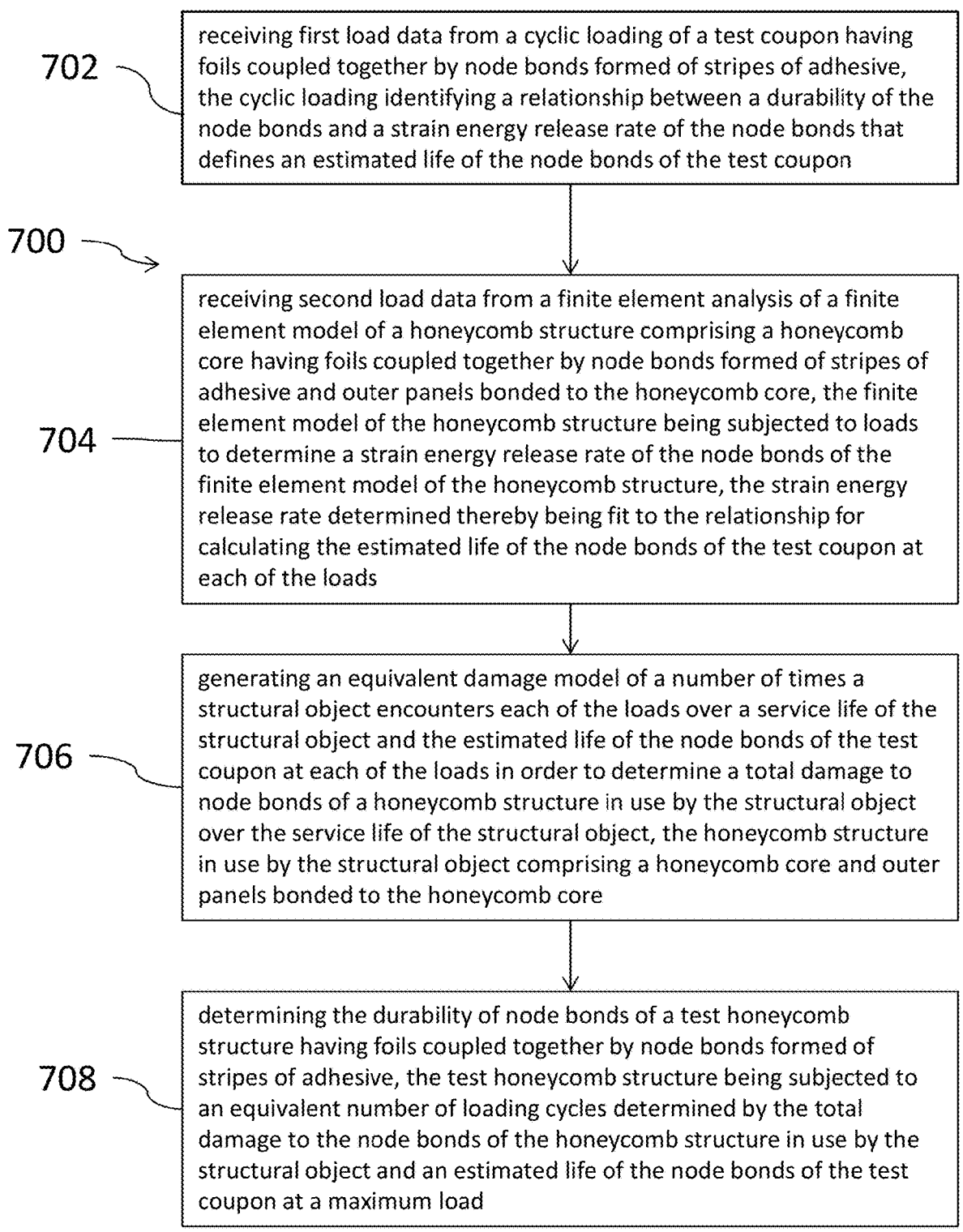
FIG. 7 is a method flow diagram of a method of testing node bonds according to exemplary aspects of the disclosure provided herein.

Reference is now made to FIG. 7, which illustrates a flowchart of various steps in a method 700 according to example implementations. As shown in block 702, the method includes receiving first load data from a cyclic loading of a test coupon having foils coupled together by node bonds formed of stripes of adhesive, the cyclic loading identifying a relationship between a durability of the node bonds and a strain energy release rate of the node bonds that defines an estimated life of the node bonds of the test coupon.

The method also includes receiving second load data from a finite element analysis of a finite element model of a honeycomb structure comprising a honeycomb core having foils coupled together by node bonds formed of stripes of adhesive and outer panels bonded to the honeycomb core, the finite element model of the honeycomb structure being subjected to loads to determine a strain energy release rate of the node bonds of the finite element model of the honeycomb structure, the strain energy release rate determined thereby being fit to the relationship for calculating the estimated life of the node bonds of the test coupon at each of the loads, as shown in block 704.

As shown in blocks 706, 708 the method further includes generating an equivalent damage model of a number of times a structural object encounters each of the loads over a service life of the structural object and the estimated life of the node bonds of the test coupon at each of the loads to determine a total damage to node bonds of a honeycomb structure in use by a structural object over the service life of the structural object, the honeycomb structure in use by the structural object comprising a honeycomb core and outer panels bonded to the honeycomb core, and determining the durability of node bonds of a test honeycomb structure having foils coupled together by node bonds formed of stripes of adhesive, the test honeycomb structure being subjected to an equivalent number of loading cycles determined by the total damage to the node bonds of the honeycomb structure in use by the structural object and an estimated life of the node bonds of the test coupon at a maximum load.

Many modifications and other implementations of the disclosure set forth herein will come to mind to one skilled in the art to which these disclosure pertain having the benefit of the teachings presented in the foregoing descriptions and the associated drawings. Therefore, it is to be understood that the disclosure are not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for testing node bonds, the method comprising:
receiving first load data from a cyclic loading of a test coupon having foils coupled together by node bonds formed of stripes of adhesive, the cyclic loading identifying a relationship between a durability of the node bonds and a strain energy release rate of the node bonds that defines an estimated life of the node bonds of the test coupon;
receiving second load data from a finite element analysis of a finite element model of a honeycomb structure comprising a honeycomb core having foils coupled together by node bonds formed of stripes of adhesive and outer panels bonded to the honeycomb core, the finite element model of the honeycomb structure being subjected to loads to determine a strain energy release rate of the node bonds of the finite element model of the honeycomb structure, the strain energy release rate determined thereby being fit to the relationship for calculating the estimated life of the node bonds of the test coupon at each of the loads;
generating an equivalent damage model of a number of times a structural object encounters each of the loads over a service life of the structural object and the estimated life of the node bonds of the test coupon at each of the loads in order to determine a total damage to node bonds of a honeycomb structure in use by the structural object over the service life of the structural object, the honeycomb structure in use by the structural object comprising a honeycomb core and outer panels bonded to the honeycomb core; and
determining the durability of node bonds of a test honeycomb structure having foils coupled together by node bonds formed of stripes of adhesive, the test honeycomb structure being subjected to an equivalent number of loading cycles determined by the total damage to the node bonds of the honeycomb structure in use by the structural object and an estimated life of the node bonds of the test coupon at a maximum load.

2. The method of claim 1, wherein receiving the first load data from the cyclic loading of the test coupon comprises receiving the first load data from fracture testing of the node bonds of the test coupon configured as a double cantilever beam, the relationship between the durability of the node bonds and the strain energy release rate of the node bonds being adapted from Paris' Law.

3. The method of claim 1, wherein receiving the second load data from the finite element analysis of the finite element model comprises receiving the second load data from application of a virtual crack closure technique on the finite element model of the honeycomb structure to compute the strain energy release rate at cracks about the honeycomb structure formed in response to the loads.

4. The method of claim 1, wherein generating the equivalent damage model comprises applying Miner's Rule to the number of times the structural object encounters each of the loads over the service life of the structural object and the estimated life of the node bonds of the test coupon at each of the loads.

5. The method of claim 1, wherein the structural object is an aircraft, and generating the equivalent damage model comprises generating the equivalent damage model to determine the total damage to the node bonds of the honeycomb structure in use by the aircraft relative to the number of times the aircraft lands at destinations having ambient temperatures different from a cure temperature of the bond between the honeycomb core and the outer panels of the honeycomb structure over the service life of the aircraft.

6. The method of claim 1, wherein determining the durability of the node bonds of the test honeycomb structure comprises subjecting the honeycomb structure to the equivalent number of loading cycles determined by the total damage to the node bonds of the honeycomb structure in use by the structural object and the estimated life of the node bonds of the test coupon at the maximum load of a standard load cycle, the estimated life of the node bonds of the test coupon at the maximum load of the standard load cycle being calculated from application, to the relationship, of a strain energy release rate of the node bonds of the finite element model of the honeycomb structure at the maximum load of the standard load cycle.

7. The method of claim 6, wherein receiving the second load data from the finite element analysis of the finite element model of the honeycomb structure comprises receiving the second load data from the finite element analysis of the finite element model of the honeycomb structure comprising carbon fiber reinforced plastic outer panels bonded on opposing surfaces of the honeycomb core having aluminum foils, the finite element model of the honeycomb structure being subjected to thermal loads to determine a strain energy release rate of the node bonds of the finite element model of the honeycomb structure, the strain energy release rate determined thereby being fit to the relationship for calculating the estimated life of the node bonds of the test coupon at each of the thermal loads.

8. The method of claim 1, wherein receiving the first load data from the cyclic loading of the test coupon comprises receiving the first load data from the cyclic loading of the test coupon having two foils each comprising a thickness of 0.002 inches to 0.100 inches and a width of 0.5 inches to 1.0 inches, the two foils being coupled together by the node bonds formed of the stripes of adhesive.

9. The method of claim 1, wherein the test coupon comprises:
a first foil and a second foil; and
stripes of adhesive serially disposed across a width of the first foil or the second foil and coupling the first foil and the second foil to one another to form the node bonds.

10. The method of claim 9, wherein the test coupon further comprises a first adherend coupled to the first foil and a second adherend coupled to the second foil such that the first foil and the second foil are provided between the first adherend and the second adherend, the first adherend and the second adherend being configured to connect to load blocks of a test apparatus configured to load the test coupon to determine characteristics of each of the node bonds formed from the stripes of adhesive.

11. The method of claim 10, wherein the test coupon further comprises adhesive disposed between the first adherend and the first foil, and disposed between the second adherend and the second foil, the adhesive being configured to couple the first adherend to the first foil and the second adherend to the second foil.

12. The method of claim 11, wherein the adhesive disposed between the first adherend and the first foil and disposed between second adherend and the second foil comprises a thickness of 0.003 inches to 0.010 inches.

13. An apparatus for testing node bonds, the apparatus comprising a processor and a memory storing executable instructions that, in response to execution by the processor, cause the apparatus to at least:
receive first load data from cyclic loading of a test coupon having foils coupled together by node bonds formed of stripes of adhesive, the cyclic loading identifying a relationship between a durability of the node bonds and a strain energy release rate of the node bonds that defines an estimated life of the node bonds of the test coupon;
receive second load data from a finite element analysis of a finite element model of a honeycomb structure comprising a honeycomb core having foils coupled together by node bonds formed of stripes of adhesive and outer panels bonded to the honeycomb core, the finite element model of the honeycomb structure being subjected to loads to determine a strain energy release rate of the node bonds of the finite element model of the honeycomb structure, the strain energy release rate determined thereby being fit to the relationship for calculating the estimated life of the node bonds of the test coupon at each of the loads;
generate an equivalent damage model of a number of times a structural object encounters each of the loads over a service life of the structural object and the estimated life of the node bonds of the test coupon at each of the loads in order to determine a total damage to node bonds of a honeycomb structure in use by the structural object over the service life of the structural object, the honeycomb structure in use by the structural object comprising a honeycomb core and outer panels bonded to the honeycomb core; and
determine the durability of node bonds of a test honeycomb structure having foils coupled together by node bonds formed of stripes of adhesive, the test honeycomb structure being subjected to an equivalent number of loading cycles determined by the total damage to the node bonds of the honeycomb structure in use by the structural object and an estimated life of the node bonds of the test coupon at a maximum load.

14. The apparatus of claim 13, wherein the apparatus is caused to receive the second load data from application of a virtual crack closure technique on the finite element model of the honeycomb structure to compute the strain energy release rate at cracks about the honeycomb structure formed in response to the loads.

15. The apparatus of claim 13, wherein the apparatus is caused to determine the durability of the node bonds of the test honeycomb structure by subjecting the honeycomb structure to the equivalent number of loading cycles determined by the total damage to the node bonds of the honeycomb structure in use by the structural object and the estimated life of the node bonds of the test coupon at the maximum load of a standard load cycle, the estimated life of the node bonds of the test coupon at the maximum load of the standard load cycle being calculated from application, to the relationship, of a strain energy release rate of the node bonds of the finite element model of the honeycomb structure at the maximum load of the standard load cycle.

16. The apparatus of claim 13, wherein the apparatus is caused to receive the second load data from the finite element analysis of the finite element model of the honeycomb structure by receiving the second load data from the finite element analysis of the finite element model of the honeycomb structure comprising carbon fiber reinforced plastic outer panels bonded on opposing surfaces of the honeycomb core having aluminum foils, the finite element model of the honeycomb structure being subjected to thermal loads to determine a strain energy release rate of the node bonds of the finite element model of the honeycomb structure, the strain energy release rate determined thereby being fit to the relationship for calculating the estimated life of the node bonds of the test coupon at each of the thermal loads.

17. The apparatus of claim 13, wherein the apparatus caused to receive the first load data from the cyclic loading of the test coupon comprises the apparatus caused to receive the first load data from fracture testing of the node bonds of the test coupon configured as a double cantilever beam, the relationship between the durability of the node bonds and the strain energy release rate of the node bonds being adapted from Paris' Law.

18. The apparatus of claim 13, wherein the apparatus caused to generate the equivalent damage model comprises the apparatus caused to apply Miner's Rule to the number of times the structural object encounters each of the loads over the service life of the structural object and the estimated life of the node bonds of the test coupon at each of the loads.

19. The apparatus of claim 13, wherein the structural object is an aircraft, and the apparatus caused to generate the equivalent damage model comprises the apparatus configured to generate the equivalent damage model to determine the total damage to the node bonds of the honeycomb structure in use by the aircraft relative to the number of times the aircraft lands at destinations having ambient temperatures different from a cure temperature of the bond between the honeycomb core and the outer panels of the honeycomb structure over the service life of the aircraft.

20. The apparatus of claim 13, wherein the apparatus configured to receive the first load data from the cyclic loading of the test coupon comprises the apparatus configured to receive the first load data from the cyclic loading of the test coupon having two foils each comprising a thickness of 0.002 inches to 0.100 inches and a width of 0.5 inches to 1.0 inches, the two foils being coupled together by the node bonds formed of the stripes of adhesive.

* * * * *